United States Patent [19]

Usuki et al.

[11] Patent Number: 5,309,224
[45] Date of Patent: May 3, 1994

[54] APPARATUS FOR CONVERTING A TELEVISION SIGNAL OF A FIRST TELEVISION SYSTEM INTO A TELEVISION SIGNAL OF A SECOND TELEVISION SYSTEM EMPLOYING A DIGITAL CHROMINANCE SIGNAL PROCESSING CIRCUIT

[75] Inventors: Naoshi Usuki; Toshiyuki Kawabe, both of Neyagawa, Japan

[73] Assignee: Matsushita Electric Industrial Co., Ltd., Osaka, Japan

[21] Appl. No.: 853,776

[22] PCT Filed: Oct. 29, 1991

[86] PCT No.: PCT/JP91/01472

§ 371 Date: Jun. 9, 1992

§ 102(e) Date: Jun. 9, 1992

[87] PCT Pub. No.: WO92/08323

PCT Pub. Date: May 14, 1992

[30] Foreign Application Priority Data

Oct. 31, 1990 [JP] Japan .................. 2-295745
Oct. 31, 1990 [JP] Japan .................. 2-295746
Nov. 30, 1990 [JP] Japan .................. 2-338019

[51] Int. Cl.$^5$ .............................................. H04N 11/20
[52] U.S. Cl. .................................... 348/443; 348/454
[58] Field of Search ............. 358/11, 140, 15, 16; H04N 11/20

[56] References Cited

U.S. PATENT DOCUMENTS

| 4,567,507 | 1/1986 | Kusakabe | 358/11 |
| 4,568,963 | 2/1986 | Sakai et al. | 358/11 |
| 4,751,573 | 6/1988 | Kubota | 358/140 |
| 5,194,937 | 4/1993 | Lee et al. | 358/11 |
| 5,218,429 | 6/1993 | Katagiri | 358/11 |

FOREIGN PATENT DOCUMENTS

| 5133688 | 9/1976 | Japan | H04N 9/42 |
| 52-35493 | 9/1977 | Japan | H04N 9/02 |
| 58213567 | 12/1983 | Japan | H04N 5/02 |
| 59103485 | 6/1984 | Japan | H04N 9/02 |
| 63-26189 | 2/1988 | Japan | H04N 11/20 |
| 63-269880 | 11/1988 | Japan | H04N 11/20 |
| 1-45799 | 10/1989 | Japan | H04N 11/20 |
| 1-321796 | 12/1989 | Japan | H04N 11/20 |
| 50988 | 3/1991 | Japan | H04N 11/20 |

Primary Examiner—James J. Groody
Assistant Examiner—Chris Grant
Attorney, Agent, or Firm—Stevens, Davis, Miller & Mosher

[57] ABSTRACT

A color television system conversion apparatus converts a television signal of a first television system into a television signal of a second television system by converting the carrier frequency of the chrominance signal of the first television system into the carrier frequency of the second television system. The carrier frequency converted chrominance signal is converted into a digital signal in response to the clock of the carrier frequency of the second television system. The digital chrominance signal is digitally decoded into two color difference signals of the first color television system. The two decoded color difference signals are converted so as to have the number of lines and the number of fields of the second television system through extraction and interpolation processes. The converted color difference signals are encoded digitally into a luminance signal of the second television system.

3 Claims, 5 Drawing Sheets

APPARATUS FOR CONVERTING A TELEVISION SIGNAL OF A FIRST TELEVISION SYSTEM INTO A TELEVISION SIGNAL OF A SECOND TELEVISION SYSTEM EMPLOYING A DIGITAL CHROMINANCE SIGNAL PROCESSING CIRCUIT

TECHNICAL FIELD

This invention relates to an apparatus for converting the color television system among the NTSC system, PAL system, and the like.

BACKGROUND ART

The conversion of color television system (will be termed simply "television system" hereinafter) involves two major items of conversion as follows.

(1) Conversion of the number of lines and the number of fields.

(2) Conversion of the carrier frequency and modulation mode for the color signal.

Among these items, the number of lines and the number of fields are generally converted via a digital signal processing operation using a digital memory or the like, and the color signal is conventionally converted through decoding and encoding via an analog signal processing operation in general.

A conventional apparatus for converting the television system based on the above-mentioned scheme will be explained with reference to FIG. 5.

Figure 5:
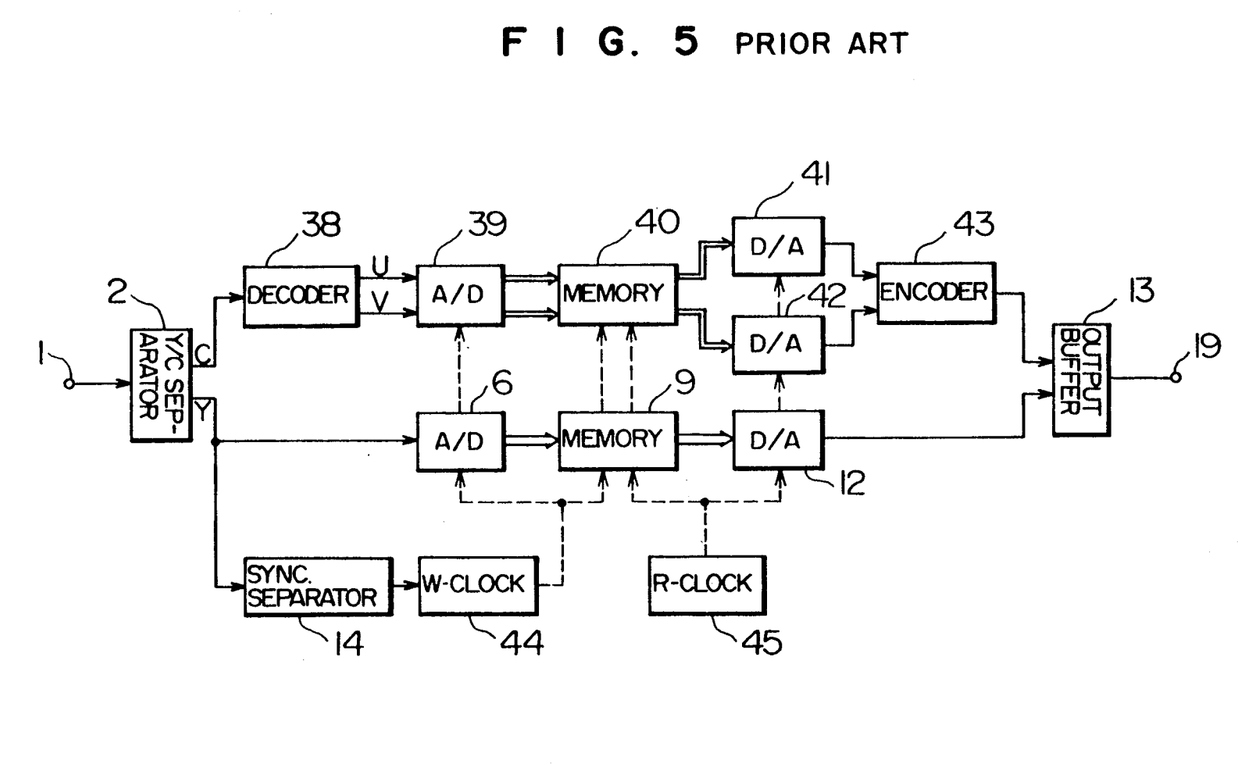
FIG. 5 is a block diagram showing the arrangement of the conventional television system conversion apparatus.

FIG. 5 is a block diagram of the conventional television system conversion apparatus. In the figure, symbol 1 denotes an input terminal for receiving a television signal to be converted. 2 is a luminance/chrominance signal separation circuit which separates the input television signal into a luminance signal and a chrominance signal. 38 is a chrominance signal decoding circuit (decoder) performing analog signal processing, and it decodes the chrominance signal into two color difference signals U and V. 39 is an analog-to-digital converter (A/D converter) for the colo signal, and it converts the two color difference signals into a digital signal by multiplexing. 40 is a digital memory for the color signal, and it is used to convert the number of lines and the number of fields through the extraction or interpolation process for the digital color difference signals in response to the controlled write clock and read clock. 41 and 42 are digital-to-analog converters (D/A converters) for the color signal, and they convert the two color difference signals, which have been subjected to the line conversion and field conversion, into analog signals. 43 is a chrominance signal encoding circuit (encoder) performing analog signal processing, and it encodes the two analog color difference signals into a chrominance signal. 6, 9 and 12 are respectively an A/D converter, a digital memory and a D/A converter for the luminance signal, and their operations are identical to those elements processing the color signal. 14 is a sync separation circuit which separates the sync signal from the luminance signal. 44 is a write clock generation circuit and 45 is a read clock generation circuit, with both clocks being controlled for the implementation of line conversion and field conversion. 13 is an output buffer circuit which delivers the converted luminance signal and chrominance signal to an output terminal 19.

The operation of the conventional television system conversion apparatus arranged as described above will be explained by taking an example of the case where a television signal of NTSC system received on the input terminal 1 is converted into a television signal of PAL system on the output terminal 19. The chrominance signal of NTSC system separated by the luminance/chrominance signal separation circuit 2 is demodulated with a right-angle 2-phase carrier of 3.58 MHz by the NTSC-based chrominance signal decoder 38 so that it is decoded into two color difference signals U and V of NTSC system. The decoded color difference signals of NTSC system are converted into digital signals by the A/D converter 39, and thereafter stored in the digital memory 40 in response to the write clock provided by the write clock generation circuit 44. Since the write clock is locked to the sync signal of NTSC system provided by the sync separation circuit 14, the two color difference signals of NTSC system are stored in the digital memory 40 such that their line number and field number are coincident with the line address and field address in the address space of the digital memory 40. Namely, 525 line numbers and 60 field numbers correspond to the addresses. The color difference signals are read out in response to the read clock which is locked to the sync signal of PAL system provided by the read clock generation circuit 45, with the number of lines being increased to 625 through the appropriate interpolation and the number of fields being reduced to 50 through the appropriate extraction, and the signals are converted into two color difference signals of PAL system. The two color difference signals of PAL system read out of the digital memory 40 are converted into analog signals by the D/A converters 41 and 42, and thereafter modulated with a right-angle 2-phase alternation carrier of 4.43 MHz by the chrominance signal encoder 43 of PAL system, resulting in a chrominance signal of PAL system.

The luminance signal of NTSC system separated by the luminance/chrominance signal separation circuit 2 is converted into a digital signal by the A/D converter 6 and then stored in the digital memory 9 in response to the write clock which is locked to the sync signal of NTSC system provided by the write clock generation circuit 44, in the same manner as for the color difference signals. The signal is read out in response to the read clock which is locked to the sync signal of PAL system provided by the read clock generation circuit 45, with the number of lines being increased from 525 to 625 through the interpolation and the number of fields being reduced from 60 to 50 through the extraction, and the resulting luminance signal of PAL system is converted into an analog signal by the D/A converter 12. The chrominance signal and luminance signal converted from NTSC system to PAL system through the foregoing process are delivered to the output terminal 19 by way of the output buffer circuit 13. In this manner, a television signal of NTSC system is converted into a television signal of PAL system.

In the reverse case of converting a television signal of PAL system into a television signal of NTSC system, the luminance/chrominance signal separation circuit 2 is of PAL system, the chrominance signal decoder 38 is of PAL system, and the chrominance signal encoder 43 is of NTSC system. In addition, the write clock generation circuit 44 is designed to produce a write clock which is locked to the sync signal of PAL system, and the read clock generation circuit 45 is designed to produce a read clock which is locked to the sync signal of NTSC system.

The foregoing prior art is disclosed in Japanese Patent Publications Nos. 51-33688 and 52-35493, for example.

However, the conventional television system conversion apparatus arranged as described above needs to have a number of chrominance signal decoders 38 and chrominance signal encoders 43 equal to the number of types of television systems of input signals and the number of types of television systems of output signals. Since these circuits are all based on analog signal processing, their circuit scale is very large and they have many adjustment parameters, and as a result their total cost is high and their reliability is low.

On this account, a conceivable variant design is to configure the chrominance signal decoder and chrominance signal encoder to operate as a digital signal processing unit. However, in the conventional television system conversion apparatus shown in FIG. 5, when the chrominance signal decoder 38 based on the digital signal processing is placed in the rear stage of the A/D converter 39 and the chrominance signal encoder 43 performing digital signal processing is placed in the front stage of the D/A converters 41 and 42, these decoders and encoders performing digital signal processing will have a considerably large circuit scale, causing the apparatus to be of significantly increased cost and to be unsuited to home use and the like.

DISCLOSURE OF INVENTION

In view of the foregoing situation, it is an object of this invention to provide a television system conversion apparatus which achieves a drastic cost reduction and elimination of adjustment through the configuration of the chrominance signal decoding circuit and chrominance signal encoding circuit operating as a simple digital signal processing unit.

In order to achieve the above objective, the present invention resides in a television system conversion apparatus comprising frequency conversion means for converting the carrier frequency of the chrominance signal of a first television system into the carrier frequency of a second television system, A/D conversion means for implementing the digital conversion for the frequency-converted chrominance signal with a clock which is responsive to the carrier frequency of the second television system, decoding means for digitally decoding the digital chrominance signal into two color difference signals of the first television system, scanning line conversion means for converting the two decoded color difference signals of the first television system to have the number of lines and the number of fields of the second television system through the extraction and interpolation processes, and encoding means for digitally encoding the two line-converted color difference signals into a chrominance signal of the second television system.

Based on the above arrangement of this invention, in converting a signal of the first television system into a signal of the second television system, the frequency conversion means converts the carrier frequency of the chrominance signal from the first television system to the second television system, and the resulting signal is subjected to digital conversion with the clock which is responsive to the carrier frequency of the second television system, and thereafter after the resulting signal is subjected to digital decoding and digital encoding, whereby it is possible to configure the digital coding means and encoding means which operate as a simple digital signal processing unit.

BEST MODE FOR CARRYING OUT THE INVENTION

Specific embodiments of this invention will be explained with reference to the drawings.

Figure 1:
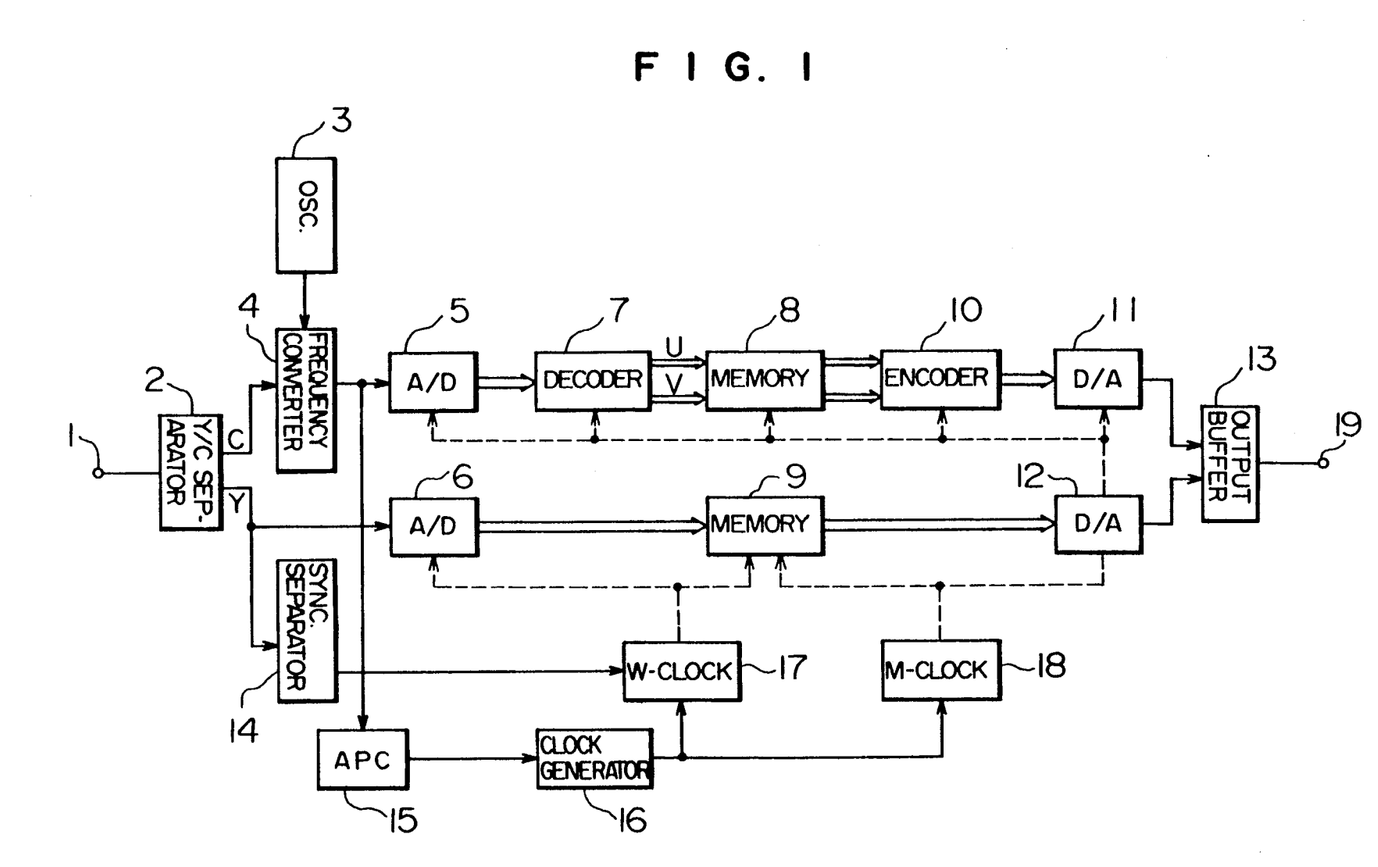
FIG. 1 is a block diagram showing the arrangement of the television system conversion apparatus based on a first embodiment of this invention.

FIG. 1 is a block diagram of the television system conversion apparatus based on the first specific embodiment of this invention. In FIG. 1, symbol 1 denotes an input terminal on which a television signal to be converted is received. 2 is a luminance/chrominance signal separation circuit which separates the input television signal into a luminance signal and a chrominance signal. 4 is a frequency converter which converts the carrier frequency of the chrominance signal based on the oscillation frequency of an oscillator 3. 5 is an A/D converter for the color signal, and it implements the digital conversion for the chrominance signal which has been subjected to the carrier frequency conversion. 7 is a chrominance signal docoding circuit performing digital signal processing, and it decodes the chrominance signal into two color difference signals U and V. 8 is a digital memory for the color signal, and it converts the number of lines and the number of fields for the digitally-decoded color difference signals through the extraction or interpolation process based on the control of the write clock and read clock. 10 is a chrominance signal encoding circuit performing digital signal processing, and it encodes the two color difference signals, which have been subjected to the line conversion and field conversion, into a chrominance signal. 11 is a D/A converter for the color signal, and it implements the analog conversion for the encoded chrominance signal. 6, 9 and 12 are respectivley an A/D converter, a digital memory and a D/A converter for the luminance signal, and their operations are identical to those element for the color signal. 14 is a sync separation circuit which separates the sync signal from the luminance signal. 15 is an APC circuit which produces a carrier signal that is locked to the burst signal of the chrominance signal provided by the frequency converter 4. 16 is a clock generator which produces a clock for digital signal processing by multiplying the carrier signal provided by the APC circuit 15. 17 is a write clock generation circuit and 18 is a reference clock generation circuit, with both clocks being controlled for implementing the conversion of the number of lines and the number of fields. 13 is an output buffer circuit which delivers the converted luminance signal and chrominance signal to the output terminal 19.

The operation of the television system conversion apparatus based on the first embodiment of this invention arranged as described above will be explained by taking an example of the case where a television signal of NTSC system received on the input terminal 1 is converted into a television signal of PAL system on the output terminal 19. The chrominance signal of NTSC system separated by the luminance/chrominance signal separation circuit 2 is frequency converted by the frequency converter 4 in accordance with the oscillation frequency, which is the difference (0.85 MHz) between the carrier frequency (3.58 MHz) of NTSC system and the carrier frequency (4.43 MHz) of PAL system or the sum (8.01 MHz) of these frequencies, provided by the oscillator 3, and the carrier frequency is converted to that of PAL system. The resulting chrominance signal with the PAL carrier frequency is fed to the A/D converter 5 and APC circuit 15. The APC circuit 15 produces a carrier signal which is locked to the burst of the input chrominance signal, i.e., the PAL carrier frequency, and delivers the signal to the clock generator 16. The clock generator 16 implements the 4-fold multiplication for the input carrier signal to produce a clock (17.7 MHz) for digital signal processing, and supplies the clock to the write clock generation circuit 17 and reference clock generation circuit 18. The write clock generation circuit 17 implements the phase modulation for the clock of digital signal processing in response to the sync signal of NTSC system provided by the sync separation circuit 14 thereby to produce a write clock which is locked to the NTSC sync signal, and delivers the resulting write clock for the luminance signal processing to the A/D converter 6 and digital memory 9.

The reference clock generation circuit 18 implements the waveform shaping for the clock of digital signal processing thereby to produce a reference clock which is locked to the PAL carrier signal, and supplies the clock as a read clock for the luminance signal processing operation and a clock for the color signal processing operation to the A/D converter 5, chrominance signal decoding circuit 7, digital memories 8 and 9, chrominance signal encoding circuit 10, and D/A converters 11 and 12. In the A/D converter 5, the chrominance signal which has been converted to the PAL carrier frequency is subjected to the digital conversion by the reference clock which is four times the PAL carrier frequency, and thereafter it is decoded into two color difference signals of PAL system by the chrominance signal decoding circuit 7. Since the chrominance signal decoding circuit 7 has its input signal derived from the chrominance signal which has been subjected to the digital conversion with the clock locked to the 4-fold carrier frequency, it can be decoded via simple signal processing without using a multiplier or the like. The decoded two color difference signals of PAL system are stored in the digital memory 8. The digital memory 8 has its address reset in accordance with the NTSC sync signal provided by the sync separation circuit 14 such that the line number and field number of the color difference signals are coincident with the line address and field address in the address space of the digital memory 8. Namely, memory writing takes place such that 525 line numbers and 60 field numbers correspond to the addresses. By reading out the signal while resetting the address in response to the PAL sync signal by the read clock which is locked to the PAL carrier signal provided by the reference clock generation circuit 18, the number of lines is increased to 625 through the appropriate interpolation and the number of fields is reduced to 50 through the appropriate extraction, and the signal is read out by being converted into two color difference signals of PAL system. The two color difference signals of PAL system read out of the digital memory 8 are encoded into a chrominance signal of PAL system by the chrominance signal encoding circuit 10. Since the color difference signals fed to the chrominance signal encoding circuit 10 are a digital version based on the reference clock which is locked to the 4-fold carrier frequency of PAL system, they can be encoded in a simple signal processing unit without using a multiplier. The encoded chrominance signal of PAL system is subjected to the analog conversion by the D/A converter 11.

The luminance signal of NTSC system separated by the luminance/chrominance signal separation circuit 2 is converted into a digital signal by the A/D converter 6 and then stored in the digital memory 9 in response to the write clock which is locked to the sync signal of NTSC system provided by the write clock generation circuit 17, in the same manner as for the color difference signals. The signal is read out in response to the read clock which is locked to the carrier signal of PAL system provided by the reference clock generation circuit 1 while being reset for the address in response to the sync signal of PAL system, with the number of lines being increased from 525 to 625 through the interpolation and the number of fields being reduced from 60 to 50 through the extraction, and consequently the luminance signal of PAL system is read out while being converted. After that the signal is converted into an analog signal by the D/A converter 12.

The chrominance signal and luminance signal converted from NTSC system to PAL system through the foregoing process are delivered to the output terminal 19 by way of the output buffer circuit 13. In this manner, a television signal of NTSC system is converted into a television signal of PAL system.

In the case of converting a television signal of PAL system into a television signal of NTSC system oppositely, the luminance/chrominance signal separation circuit 2 is of PAL system, and the frequency converter 4 is of a design for converting the chrominance signal from the PAL carrier frequency to the NTSC carrier frequency. In addition, the write clock generation circuit 17 is designed to produce a write clock which is locked to the sync signal of PAL system, and the reference clock generation circuit 18 is designed to produce a reference clock which is locked to the carrier signal of NTSC system.

Figure 4:
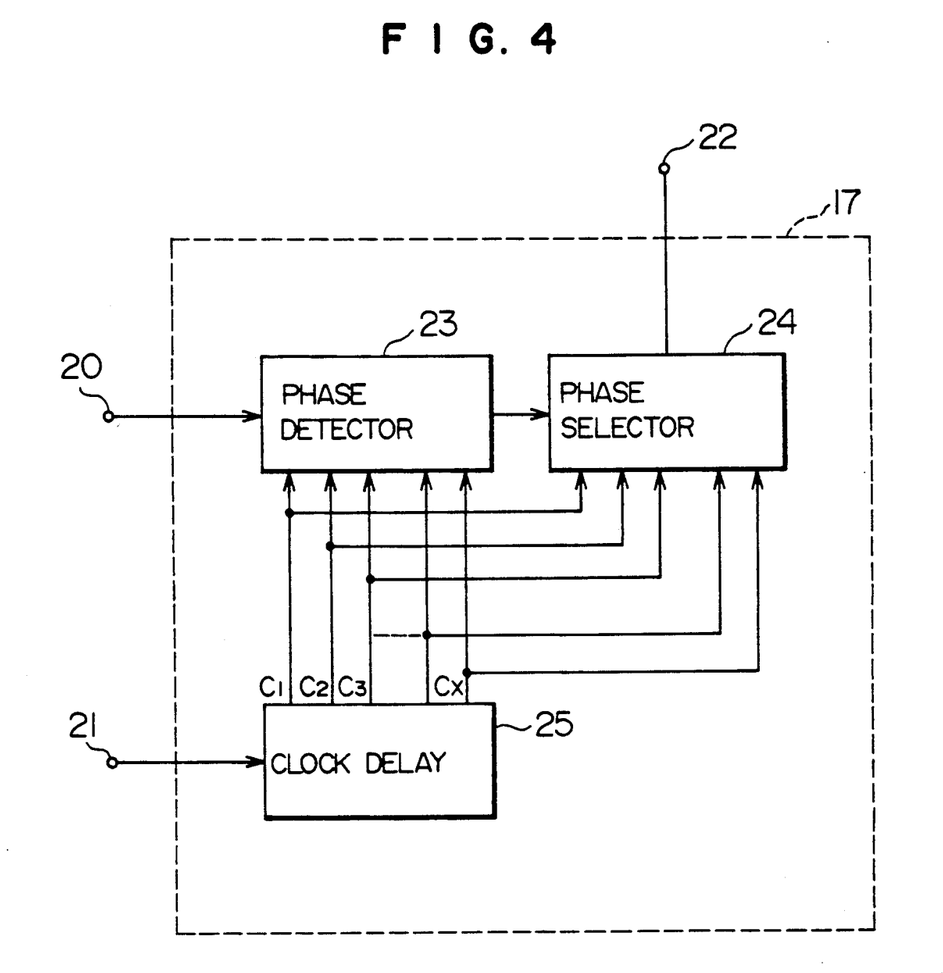
FIG. 4 is a block diagram showing the internal arrangement of the write clock generation circuit 17 in FIG. 1 through FIG. 3.

Next, a specific circuit arrangement of the write clock generation circuit 17 will be explained.

FIG. 4 is a block diagram of the write clock generation circuit. In FIG. 4, indicated by 20 is a sync input terminal on which the sync signal provided by the sync separation circuit 14 is received, 21 is a clock input terminal on which the clock for digital signal processing provided by the clock generation circuit 16 is received, and 22 is an output terminal of the write clock. Indicated by 25 is a clock delay device which delays the clock received on the clock input terminal 21 to produce a set of delayed clocks (C1-Cn), 23 is a phase detector which compares the phase between the delayed clocks and the sync signal received on the sync input terminal 20, and 24 is a phase selector which selects one of the delayed clocks depending on the phase detection result of the phase detector 23.

The write clock generator 17 arranged as described above operates, when the assumption is made that a clock derived from a multiplied PAL carrier signal is received on the clock input terminal 21 and a sync signal of NTSC system is received on the sync input terminal 20, to detect a clock with the phase closest to the NTSC sync signal out of the delayed clocks provided by the clock delay device 25, and the clock of that phase is selected by the phase selector 24 and delivered to the output terminal 22. As a result, the write clock delivered through the output terminal 22 is a clock which is locked to the syn signal of NTSC system while being a multiplied carrier frequency of PAL system. In this manner, a write clock which is locked to the sync signal can be generated in a simple circuit arrangement.

As described above, this invention, in which the chrominance signal has its carrier frequency converted by the frequency converter 4 and thereafter is subjected to the digital conversion for the carrier decoding process performing a digital signal processing operation, accomplishes the carrier decoding circuit 7 and carrier encoding circuit 10 in a very simple circuit arrangement.

Next, the second embodiment of this invention will be described.

Figure 2:
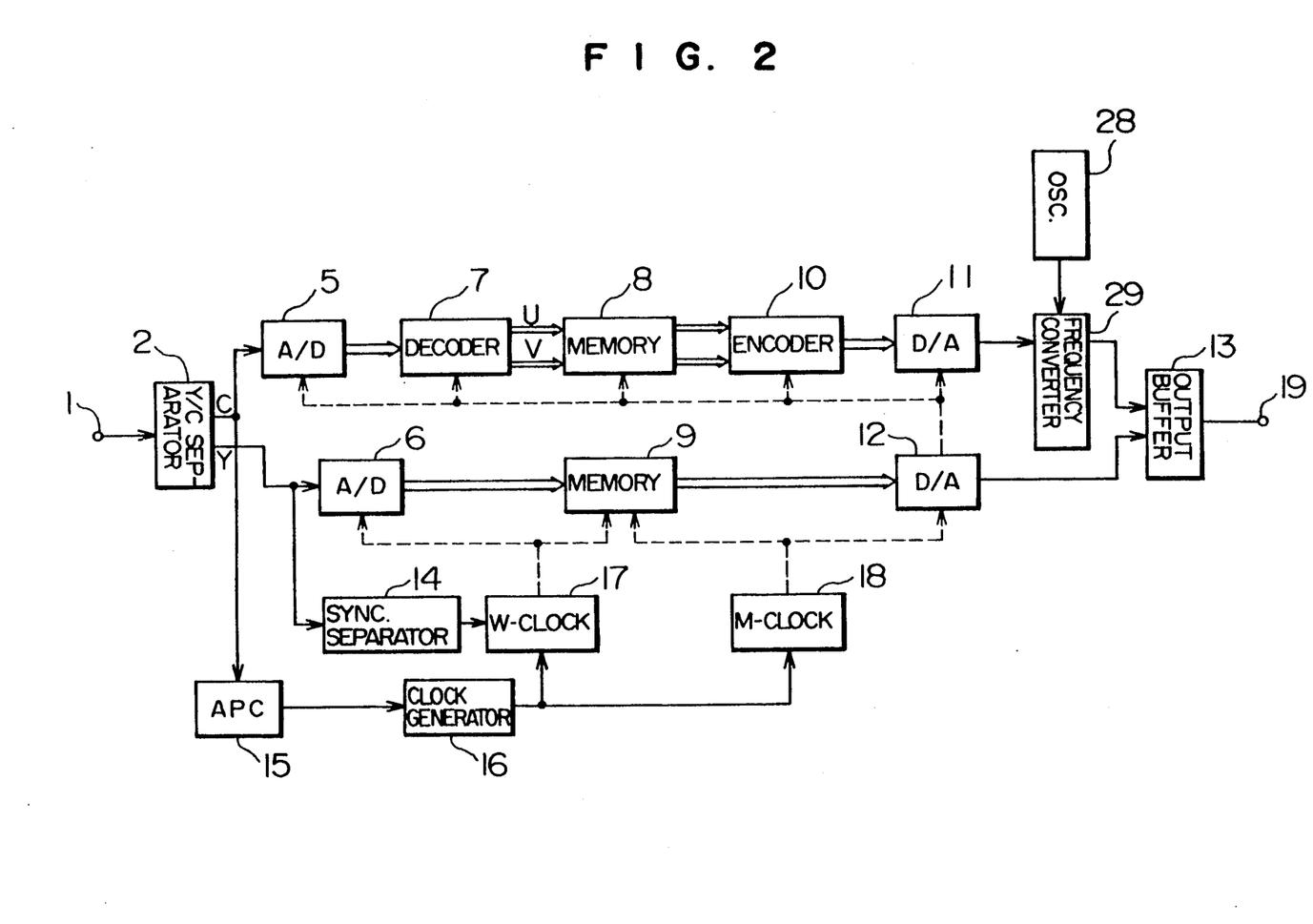
FIG. 2 is a block diagram showing the arrangement of the television system conversion apparatus based on a second embodiment of this invention.

FIG. 2 is a block diagram of the television system conversion apparatus based on the second embodiment of this invention. In FIG. 2, symbol 1 denotes an input terminal on which a television signal to be converted is received. 2 is a luminance/chrominance signal separation circuit which separates the input television signal into a luminance signal and a chrominance signal. 5 is an A/D converter for the color signal, and it implements the digital conversion for the chrominance signal. 7 is a chrominance signal docoding circuit performing digital signal processing, and it decodes the chrominance signal into two color difference signals U and V. 8 is a digital memory for the color signal, and it converts the number of lines and the number of fields for the digitally-decoded color difference signals through the extraction or interpolation process based on the control of the write clock and read clock. 10 is a chrominance signal encoding circuit based on digital signal processing, and it encodes the two color difference signals, which have been subjected to the line conversion and field conversion, into a chrominance signal. 11 is a D/A converter for the color signal, and it implements the analog conversion for the encoded chrominance signal. 6, 9 and 12 are respectively an A/D converter, a digital memory and a D/A converter for the luminance signal, and their operations are identical to those element for the color signal. 14 is a sync separation circuit which separates the syn signal from the luminance signal. 15 is an APC circuit which produces a carrier signal that is locked to the burst signal of the chrominance signal separated by the luminance/chrominance signal separation circuit 2. 16 is a clock generator which produces a clock for digital signal processing by multiplying the carrier signal provided by the APC circuit. 17 is a write clock generation circuit and 18 is a reference clock generation circuit, with both clocks being controlled for implementing the conversion of the number of lines and the number of fields. 29 is a frequency converter which converts the carrier frequency of the chrominance signal provided by the D/A converter 11 based on the oscillation frequency of an oscillator 28. 13 is an output buffer circuit which delivers the converted luminance signal and chrominance signal to the output terminal 19.

The operation of the television system conversion apparatus based on the second embodiment of this invention arranged as described above will be explained by taking an example of the case where a television signal of NTSC system received on the input terminal 1 is converted into a television signal of PAL system on the output terminal 19. The chrominance signal of NTSC system separated by the luminance/chrominance signal separation circuit 2 is fed to the A/D converter 5 and APC circuit 15. The APC circuit 15 produces a carrier signal which is locked to the burst of the input chrominance signal, i.e., a carrier signal with the NTSC carrier frequency, and delivers the signal to the clock generator 16. The clock generator 16 implements the 4-fold multiplication for the input carrier signal to produce a clock (14.3 MHz) for digital signal processing, and supplies the clock to the write clock generation circuit 17 and reference clock generation circuit 18. The write clock generation circuit 17 implements the phase modulation for the clock of digital signal processing in response to the sync signal of NTSC system provided by the sync separation circuit 14 thereby to produce a write clock which is locked to the NTSC sync signal, and delivers the resulting write clock for the luminance signal processing to the A/D converter 6 and digital memory 9. The reference clock generation circuit 18 implements the waveform shaping for the clock of digital signal processing thereby to produce a reference clock which is locked to the NTSC carrier signal, and supplies the clock as a read clock for the luminance signal processing operation and a clock for the color signal processing operation to the A/D converter 5, chrominance signal decoding circuit 7, digital memories 8 and 9, chrominance signal encoding circuit 10, and D/A converters 11 and 12. In the A/D converter 5, the chrominance signal of NTSC system is subjected to the digital conversion by the reference clock which is four times the NTSC carrier frequency, and thereafter it is decoded into two color difference signals of NTSC system by the chrominance signal decoding circuit 7. Since the chrominance signal decoding circuit 7 has its input signal derived from the chrominance signal which has been subjected to the digital conversion with the clock locked to the 4-fold carrier frequency, it can be decoded via simple signal processing without using a multiplier or the like. The two decoded color difference signals of NTSC system are stored in the digital memory 8. The digital memory 8 has its address reset in accordance with the NTSC sync signal provided by the sync separation circuit 14 such that the line number and field number of the color difference signals are coincident with the line address and field address in the address space of the digital memory 8. Namely, memory writing takes place such that 525 line numbers and 60 field numbers correspond to the addresses. By reading out the signal while resetting the address in response to the PAL sync signal by the read clock provided by the reference clock generation circuit 18, the number of lines is increased to 625 through the appropriate interpolation and the number of fields is reduced to 50 through the appropriate extraction, and the signal is read out by being converted into two color difference signals of PAL system. The read clock is derived from the reference clock with a 4-fold frequency (14.3 MHz) of the NTSC carrier frequency, and in generating the address reset signal which complies with the sync signal of PAL system from this clock, a small error will emerge in the sync signal of PAL system. However, this frequency error is small enough for the ordinary television receiver. In this manner, the two color difference signals of PAL system read out of th digital memory 8 are encoded into a chrominance signal of NTSC system by the chrominance signal encoding circuit 10. Since the color difference signals fed to the chrominance signal encoding circuit 10 are a digital version based on the reference clock which is locked to the 4-fold carrier frequency of NTSC system, they can be encoded via a simple signal processing operation without using a multiplier. The encoded chrominance signal of PAL system having the carrier frequency of NTSC system is subjected to analog conversion by the D/A converter 11. After that, the analog-converted chrominance signal is subjected to frequency conversion by the frequency converter 29 in accordance with the oscillation frequency, which is the difference (0.85 MHz) between the carrier frequency (3.58 MHz) of NTSC system and the carrier frequency (4.43 MHz) of PAL system or the sum (8.01 MHz) of these frequencies, provided by the oscillator 28, and the carrier frequency is converted to that of PAL system.

The luminance signal of NTSC system separated by the luminance/chrominance signal separation circuit 2 is converted into a digital signal by the A/D converter 6 and then stored in the digital memory 9 in response to the write clock which is locked to the sync signal of NTSC system provided by the write clock generation circuit 17, in the same manner as for the color difference signals. The signal is read out in response to the read clock which is locked to the carrier signal of PAL system provided by the reference clock generation circuit 18 while being reset for the address in response to the sync signal of PAL system, with the number of lines being increased from 525 to 625 through the interpolation and the number of fields being reduced from 60 to 50 through the extraction, and consequently the luminance signal of PAL system is read out while being convered. After that, the signal is converted into an analog signal by the D/A converter 12.

The chrominance signal and luminance signal converted from NTSC system to PAL system through the foregoing process are delivered to the output terminal 19 by way of the output buffer circuit 13. In this manner, a television signal of NTSC system is converted into a television signal of PAL system.

In the reverse case of converting a television signal of PAL system into a television signal of NTSC system, the luminance/chrominance signal separation circuit 2 is of PAL system, and the frequency converter 29 is of design for converting the chrominance signal from the PAL carrier frequency to the NTSC carrier frequency In addition, the write clock generation circuit 17 is designed to produce a write clock which is locked tc, the sync signal of PAL system, and the reference clock generation circuit 18 is designed to produce a reference clock which is locked to the carrier signal of NTSC system.

Next, the third embodiment of this invention will be described. The third embodiment is a television system conversion apparatus for the reproduced signal of a television signal reproduction apparatus.

Figure 3:
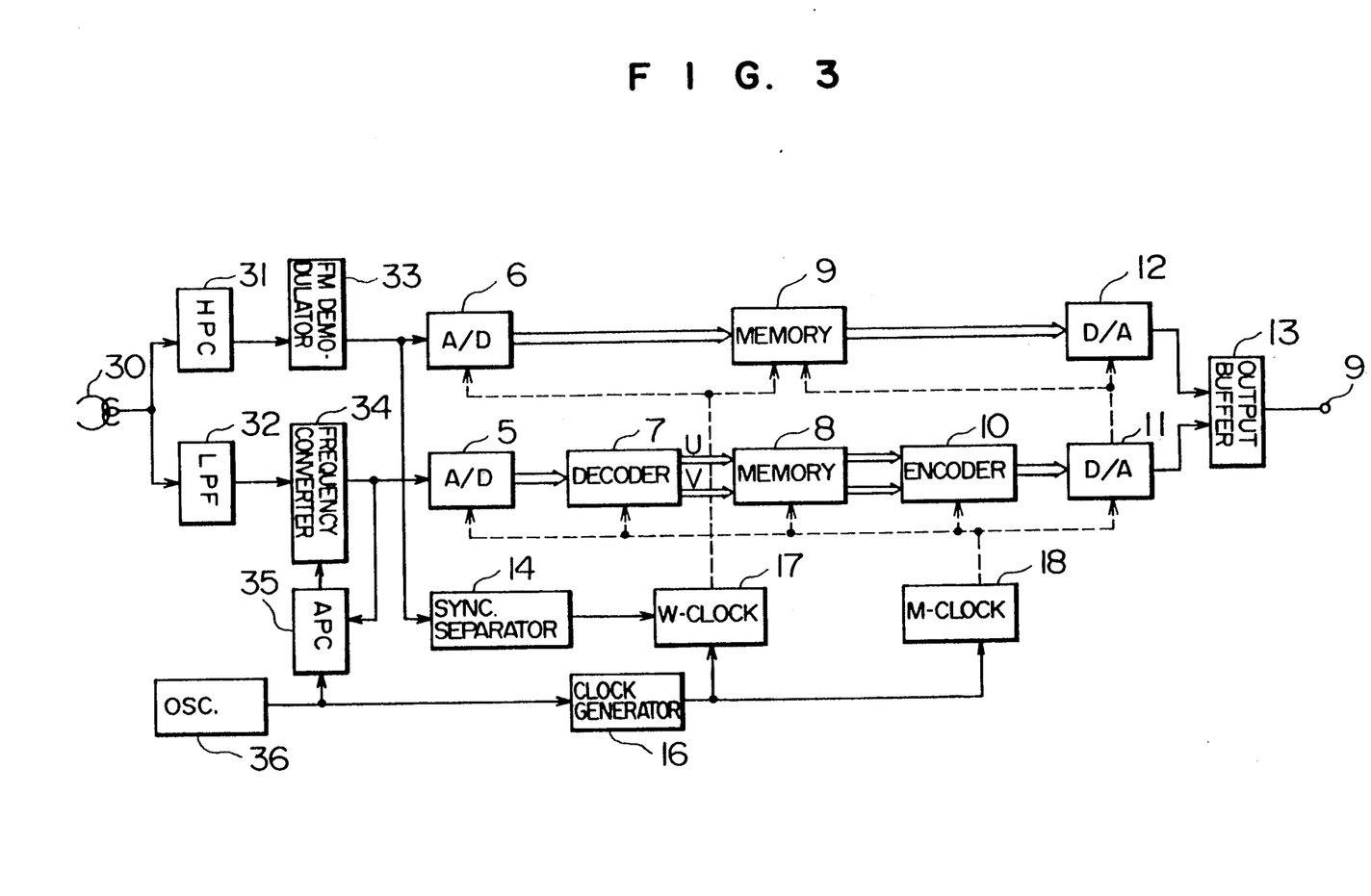
FIG. 3 is a block diagram showing the arrangement of the television signal reproduction apparatus based on a third embodiment of this invention.

FIG. 3 is a block diagram of the television system conversion apparatus based on the third embodiment of this invention. In FIG. 3, indicated by 30 is a playback head which retrieves a frequency-modulated luminance signal and a low-frequency-converted chrominance signal 31 is a high-pass filter for separating the frequency-modulated luminance signal. 32 is a low-pass filter for separating the low-frequency-converted chrominance signal. 33 is a frequency demodulator which implements the frequency demodulation for the frequency-modulated luminance signal separated by the high-pass filter 31. 34 is a frequency converter which converts the carrier frequency of the low-frequency-converted chrominance signal separated by the low-pass filter 32 into the signal frequency of an oscillator 36. 35 is an APC circuit which eliminates the phase fluctuation of the carrier caused by the jitter of the reproduced low-frequency-converted chrominance signal thereby to stabilize the carrier frequency of the chrominance signal which is subjected to frequency conversion by the frequency converter 34. 5 is an A/D converter for the color signal, and it converts the chrominance signal of the converted carrier frequency into a digital signal. 7 is a chrominance signal decoding circuit performing digital signal processing, and it decodes the chrominance signal into two color difference signals U and V. 8 is a digital memory for the color signal, and it converts the number of lines and the number of fields of the digitally decoded color difference signals through the extraction or interpolation process based on the control of the write clock and read clock. 10 is a chrominance signal encoding circuit performing digital signal processing and it encodes the two color difference signals, which have been subjected to line conversion and field conversion, into a chrominance signal. 11 is a D/A converter for the color signal, and it converts the encoded chrominance signal into an analog signal. 6, 9 and 12 are respectively an A/D converter, a digital memory and a D/A converter for the luminance signal, and their operations are identical to those elements for the color signal. 14 is a sync separation circuit which separates the sync signal from the luminance signal 16 is a clock generator which produces a clock for digital signal processing by multiplying the signal frequency generated by the oscillator 36. 17 is a write clock generation circuit and 18 is a reference clock generation circuit, with both clocks being controlled for implementing the conversion of the number of lines and the number of fields 13 is an output buffer circuit which delivers the converted luminance signal and chrominance signal to the output terminal 19.

The operation of the television system conversion apparatus based on the third embodiment of this invention arranged as described above will be explained by taking an example of the case where a television signal of NTSC system reproduced by the playback head 30 is converted into a television signal of PAL system on the output terminal 19. The low-frequency-converted chrominance signal of NTSC system separated by the low-pass filter 32 is controlled by the APC circuit 35 so that the frequency is converted by the frequency converter 34 to the carrier frequency (4.43 MHz) of PAL system provided by the oscillator 36. The chrominance signal of the PAL carrier frequency is delivered to the A/D converter 5 and also fed back to the APC circuit 35.

The clock generator 16 implements the 4-fold multiplication for the PAL carrier signal provided by the oscillator 36 thereby to produce a clock (17.7 MHz) for digital signal processing, and supplies the clock to the write clock generation circuit 17 and reference clock generation circuit 18. The write clock generation circuit 17 implements the phase modulation for the clock of digital signal processing in response to the sync signal of NTSC system provided by the sync separation circuit 14 thereby to produce a write clock which is locked to the NTSC sync signal, and delivers the resulting write clock for the luminance signal processing to the A/D converter 6 and digital memory 9. The reference clock generation circuit 18 implements the waveform shaping for the clock of digital signal processing thereby to produce a reference clock which is locked to the PAL carrier signal, and supplies the clock as a read clock for the luminance signal processing and a clock for the color signal processing to the A/D converter 5, chrominance signal decoding circuit 7, digital memories 8 and 9, chrominance signal encoding circuit 10, and D/A converters 11 and 12. In the A/D converter 5, the chrominance signal of the PAL carrier version is subject to digital conversion by the reference clock which is four times the PAL carrier frequency, and thereafter it is decoded into two color difference signals of PAL system by the chrominance signal decoding circuit 7. Since the chrominance signal decoding circuit 7 has its input signal derived from the chrominance signal which has been subject to digital conversion with the clock locked to the 4-fold carrier frequency, it can be decoded via a simple signal processing operation without using a multiplier or the like. The decoded two color difference signals of PAL system are stored in the digital memory 8. The digital memory 8 has its address reset in accordance with the NTSC sync signal provided by the sync line separation circuit 14 such that the line number and field number of the color difference signals are coincident with the line address and field address in the address space of the digital memory 8. Namely, memory writing takes place such that 525 line numbers and 60 field numbers correspond to the addresses. By reading out the signal while resetting the address in response to the the read clock which is locked to the PAL carrier signal provided by the reference clock generation circuit 18, the number of lines is increased to 625 through the appropriate interpolation and the number of fields is reduced to 50 through the appropriate extraction, and the signal is read out by being converted into two color difference signals of PAL system. In this manner, the two color difference signals of PAL system read out of the digital memory 8 are encoded into a chrominance signal of PAL system by the chrominance signal encoding circuit 10. Since the color difference signals fed to the chrominance signal encoding circuit 10 are a digital version based on the reference clock which is locked to the 4-fold carrier frequency of PAL system, it can be encoded via a simple signal processing operation without using a multiplier or the like. The encoded chrominance signal of PAL system is subject to analog conversion by the D/A converter 11. The frequency-modulated luminance signal of NTSC system delivered by the high-pass filter 21 is subject to frequency demodulation by the frequency demodulator 33, thereafter converted into a digital signal by the A/D converter 6, and then stored in the digital memory 9 in response to the write clock which is locked to the sync signal of NTSC system provided by the write clock generation circuit 17, in the same manner as for the color difference signals. The signal is read out in response to the read clock which is locked to the carrier signal of PAL system provided by the reference clock generation circuit 18 while being reset for the address in response to the sync signal of PAL system, with the number of lines being increased from 525 to 625 through the interpolation and the number of fields being reduced from 60 to 50 through the extraction, and consequently the luminance signal of PAL system is read out while being converted. After that, the signal is converted into an analog signal by the D/A converter 12.

The chrominance signal and luminance signal converted from NTSC system to PAL system through the foregoing process are delivered to the output terminal 19 by way of the output buffer circuit 13. In this manner, a television signal of NTSC system is converted into a television signal of PAL system.

In the case of converting a reproduced television signal of PAL system into a television signal of NTSC system oppositely, the oscillator 36 is designed to generate the carrier frequency of NTSC system, and the frequency converter 4 is designed to convert the low-frequency-converted chrominance signal to have the carrier frequency of NTSC system. In addition, the write clock generation circuit 17 is designed to produce a write clock which is locked to the sync signal of PAL system, and the reference clock generation circuit 18 is designed to produce a reference clock which is locked to the carrier signal of NTSC system.

INDUSTRIAL APPLICABILITY

According to this invention, as described above, the chrominance signal decoding circuit and chrominance signal encoding circuit can be configured in the form of a simple digital signal processing unit, and drastic cost reduction and elimination of adjustment can be accomplished. As a result, a television system conversion apparatus which is inexpensive overall, less variant, and reliable can be realized.

We claim:

1. An apparatus for converting the television system comprising:
   frequency conversion means for converting the carrier frequency of a chrominance signal of a first television system into the carrier frequency of a second television system;
   A/D conversion means for converting the carrier frequency converted chrominance signal and a luminae signal of the first television system into digital signals in response to a clock which is responsive to the carrier frequency of the second television system;
   decoding means for digitally decoding the digital carrier frequency converted chrominance signal into two color difference signals of the first television system;
   scanning line conversion means for converting the two decoded color difference signals of the first television system and the digital luminance signal of the first television system to have the number of lines and the number of fields of the second television system through extraction and interpolation processes;
   encoding means for digitally encoding the two line-converted color difference signals into a chrominance signal of the second television system; and
   D/A conversion means for converting the enclosed chrominance signal of the second television system and the line-converted luminance signal of the second television signal into analog signals in response to a clock which is responsive to the carrier frequency of the second television system.

2. An apparatus for convering the television system comprising;
   A/D conversion means for converting a luminance signal of a first television and a chrominance signal of the first television system into digital signals in response to a clock which is responsive to the carrier frequency of the first television system;

decoding means for digitally decoding the digital chrominance signal of the first television system into two color difference signals of the first television system;

scanning line conversion means for converting the two decoded color difference signals of the first television system and the digital luminance signal of the first television system to have the number of lines and the number of fields of the second television system through extraction and interpolation processes;

encoding means for digitally encoding the two line-converted color difference signals into a chrominance signal of the first television system;

A/D conversion means for converting the encoded chrominance signal and the line-converted luminance signal of the second television system into a chrominance analog signal and a limunance analog signal in response to the clock which is responsive to the carrier frequency of the first television system; and frequency conversion means for converting the carrier frequency of the analog chrominance signal into the carrier frequency of the second television system thereby to produce a chrominance siganl of the second television system.

3. An apparatus for convering the television system comprising;

reporducing means for reproducing a frequency-modulated luminance signal and a low-frequency converted chrominance signal of a first television system;

frequency demodulation means for implementing the frequency demodulation for the reproduced frequency-modulated luminance siganl thereby tp porduce a luminace signal of the first television system;

frequency conversion means for converitng the carrier frequency of the reproduced low-frequency-converted chrominance siganl to the carrier frequency of a second color television system;

an A/D converter for converting the carrier frequency converted chrominance siganl and the luminance siganl of the first television system into digital signals in response to a clock which is responsive to the carrier frequency of the second television system;

decoding means for digitally decoding the digital carrier frequency converted chrominance signal into two color difference signals of the first television system;

scanning line conversion means for convering the two decoded color difference siganls of the first television system and the digital luminance signal of the television system to have the number of lines and the number of fields of the second television system through extraction and interpolation processes;

encoding means for digitally encoding the two line-converted color difference siganls into a chrominance signal of the second television system; and D/A conversion means for converting the encoded chrominance signal of the second television system and the line-converted luminance siganl of the second television system into analog siganls in response to a clock which is responsive to the carrier frequency of the second television system.

* * * * *